(No Model.)
J. E. WILLIAMS.
TANK COMBINED WITH THERMOMETER AND GAGE.
No. 522,927. Patented July 10, 1894.
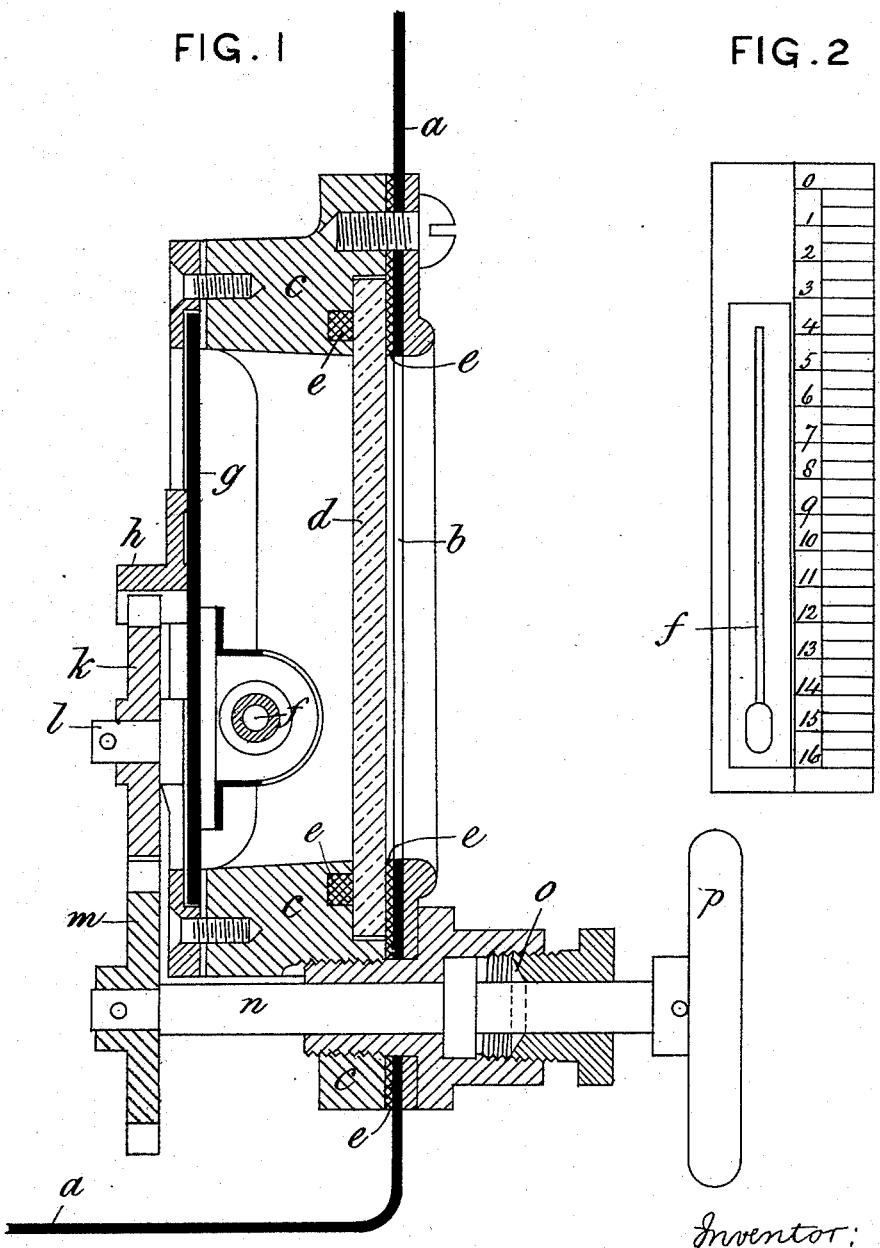

UNITED STATES PATENT OFFICE.

JOHN E. WILLIAMS, OF LONDON, ENGLAND, ASSIGNOR TO WERNER & PFLEIDERER, OF SAME PLACE, AND CANNSTADT, GERMANY.

TANK COMBINED WITH THERMOMETER AND GAGE.

SPECIFICATION forming part of Letters Patent No. 522,927, dated July 10, 1894.

Application filed February 21, 1894. Serial No. 501,045. (No model.) Patented in England January 27, 1893, No. 1,869.

*To all whom it may concern:*

Be it known that I, JOHN EDWARD WILLIAMS, engineer, a subject of the Queen of Great Britain, residing at 193 Gypsy Road, West Norwood, London, England, have invented a certain new and useful tank, combined with thermometer and gage for indicating the temperature existing in and the quantity of liquor withdrawn from tanks, cisterns, and the like, (for which I have obtained a patent in Great Britain, No. 1,869, dated January 27, 1893,) of which the following is a specification.

The object of my invention is to provide and fit tanks, cisterns and the like (all hereinafter, for the sake of brevity called tanks) with a combined apparatus for enabling the operator withdrawing liquids therefrom, to ascertain the quantity and temperature of the same; such apparatus being specially (but not exclusively) applicable for use in bakeries, breweries, and other analogous places. I make an opening in the tank, and fit the same with a suitable frame and glass, through which the height of the liquid, and the scale or thermometer, or both, may be seen. To this frame I fit a gage or sliding scale-board provided with a thermometer, the thermometer being attached to the gage or "scale" board. The gage or scale board is fitted with a rack, in gear with a pinion, or with other well known mechanical appliances, for raising and lowering the same by hand, so that the operator may be enabled to set it to any point, more particularly the zero mark of the scale to the liquid level, previously to reading the temperature or withdrawing liquid from the tank, and thus ascertain with precision, when the temperature desired at any point is reached and when he has withdrawn the required quantity of liquid.

The gage and scale board may be made of metal, wood, or any other suitable material, or combination of materials; and, when made of wood, or partly of wood, or hollow sheet metal or other material of low specific gravity, I sometimes make the same by giving it the required bulk or by suspending and balancing it to gage with the zero mark of the scale at the liquid level.

When the scale or the thermometer, or the two combined are constructed and balanced so as to strand in the liquid with the zero mark of the scale in a horizontal plane, corresponding to or identical with the level of the water or other liquid in the tank, the plug of the tap used for drawing off may be fitted or connected with an eccentric, or stopping lever, or other suitable contrivance, holding the scale in a stationary position, while the tap is open, and capable of releasing it only when the tap is closed; or the scale may be temporarily held in a stationary position by means of a set or thumb screw or a wire or cord attached thereto, as hereinafter described.

In order that my said invention may be particularly described and ascertained, reference is hereby made to the accompanying drawings, in which similar letters of reference indicate corresponding parts.

Figure 1 is a horizontal section of the apparatus, showing one method of fitting the same to a tank, and Fig. 2 is an elevation of the combined scale and thermometer.

$a$ is a portion of a tank. $b$ is an opening or window formed in the tank, and fitted with a frame $c$.

$d$ is a plate of glass fitted in the opening, and rendered watertight by rubber or other packing $e$ $e$.

$f$ is the thermometer attached to the gage or scale board $g$, which slides up and down therewith.

$h$ is a toothed rack or chain fitted to the back of the gage.

$k$ is a pinion, loose on the stud $l$, and $m$ is another pinion fast on the spindle $n$. The spindle is fitted in a stuffing box $o$, and is actuated by a hand wheel $p$, as shown. By turning the hand wheel $p$ in either direction, as required, the pinion $m$ turns the pinion $k$, and the latter acts upon the rack $h$, so as to raise or lower the gage scale board $g$ and thermometer $f$.

It is obvious that any other well known mechanical methods of raising, lowering or fixing the gage or scale board may be utilized; thus, one pinion only may be fitted to operate the rack: or a cranked lever may be fitted to the spindle $n$ connected with the scale board by a link: or the scale board may be balanced, raised, and lowered, by means of a wire passing through a stuffing box (if necessary) or by a cord with or without counterweight; or other equivalent devices may be used for the same purpose.

I claim—

1. The combination with a tank provided with a glazed opening or window, of a vertically movable gage or scale-board provided with a thermometer, and means for adjusting said gage, substantially as described.

2. The combination with a tank having a glazed opening or window, of a vertically movable gage or scale board provided with a thermometer, and rack and pinion gearing for adjusting said gage, substantially as described.

Dated this 30th day of December, 1893.

JOHN E. WILLIAMS.

Witnesses:
DANIEL ALESBURY,
L. H. WILLIAMS,
    *Both of Edenderry, Kings Co.*